United States Patent [19]
Heitstuman

[11] Patent Number: 5,911,671
[45] Date of Patent: Jun. 15, 1999

[54] DETHATCHING SYSTEM

[76] Inventor: Elmer Heitstuman, 815 Snider Dr., Walla Walla, Wash. 99362

[21] Appl. No.: 08/971,156

[22] Filed: Nov. 14, 1997

[51] Int. Cl.$^6$ ..................................................... A01D 34/48
[52] U.S. Cl. ........................................... 56/16.4 R; 56/202
[58] Field of Search ............................... 56/16.4 R, 16.6, 56/DIG. 21, 344, 350, 372, 12.4, 202, 12.5, 400.02, 14.8, 16.9

[56] References Cited

U.S. PATENT DOCUMENTS

| | | | |
|---|---|---|---|
| 2,634,573 | 4/1953 | Carroll | 56/355 |
| 2,729,047 | 1/1956 | Cheatum | 56/344 |
| 3,241,301 | 3/1966 | Dyrdahl | 56/23 |
| 4,068,455 | 1/1978 | Zehrung, Jr. et al. | 56/344 |
| 4,172,356 | 10/1979 | Cole | 56/377 |
| 4,745,735 | 5/1988 | Katayama | 56/202 |
| 4,910,948 | 3/1990 | Nelson | 56/16.1 |
| 4,970,852 | 11/1990 | Check et al. | 56/199 |
| 5,007,235 | 4/1991 | Nickel et al. | 56/12.4 |
| 5,036,651 | 8/1991 | Nelson | 56/16.4 |
| 5,142,852 | 9/1992 | Nelson | 56/16.6 |
| 5,408,813 | 4/1995 | Haban et al. | 56/14.8 |
| 5,577,375 | 11/1996 | Tillison, Sr. | 56/17.5 |

*Primary Examiner*—Thomas B. Will
*Assistant Examiner*—Robert Pezzuto
*Attorney, Agent, or Firm*—Chernoff, Vilhauer, McClung & Stenzel, LLP

[57] ABSTRACT

A grass dethatching system includes a frame with at least one support member suitable to support the frame above the grass, the frame is adapted for mounting a dethatching apparatus, and the frame is adapted for detachably attaching to a vehicle. The dethatching apparatus includes a dethatch assembly rotatable about a central axis and at least one elongate member rotatable with the dethatch assembly at a location offset from the central axis. A plurality of tines are freely rotatably connected to and spaced apart along the elongate member in such a manner that the tines will periodically contact the grass when the dethatch assembly is rotated about the central axis. A drive assembly is connected to the frame which rotates the dethatch assembly at a rotational speed independent of the motion of the support member.

8 Claims, 1 Drawing Sheet

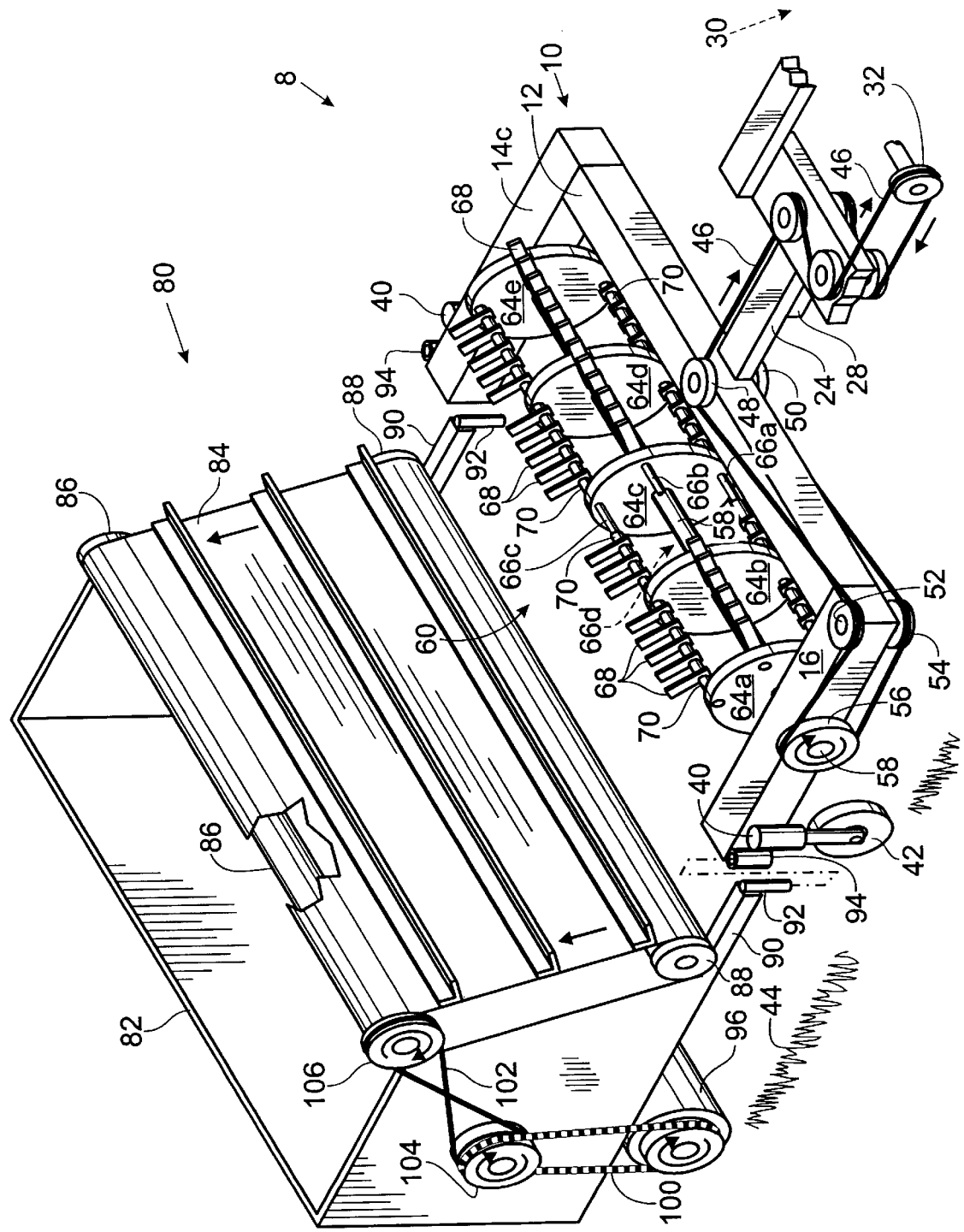

DETHATCHING SYSTEM

BACKGROUND OF THE INVENTION

The present invention relates to a dethatching system for attachment to a tractor that includes a flail dethatching mechanism and catcher bag.

Properly maintaining a lawn or the like involves dealing with thatch which is an unattractive brown layer of dead grass and vegetation which covers the ground surface. Excess thatch can result in many troubles, such as, for example, encouragement of grass root development above the surface of the soil (within the thatch) promoting "brown-off" and winter injury, increase watering needs to maintain greenness of the grass, increase the difficulty of mowing when the "spongy" surface allows the mower wheels to sink down into the lawn, provides a home for insects and lawn disease, restricts water and air movement into and within the soil, and inhibits the downward movement of pesticides and fertilizers into the soil. Accordingly, the periodic removal of thatch is desirable to maintain a healthy green lawn.

Several devices have been developed in an effort to remove thatch from the ground surface. One of the most common devices used to remove thatch is a hand-held rake. The rake is drawn across the ground surface to dislodge the thatch and plant matter. Unfortunately, raking can be unpleasant, strenuous, and time consuming. Also, raking results in dislodged thatch that must be collected and removed to a appropriate location remote from the lawn.

Another type of dethatcher includes tines which do not rotate and are mounted in front of or behind a tractor. In such a device, a plurality of tines project vertically downward toward the ground from a horizontal surface secured to the tractor. As the tractor moves, the tines are drawn across the ground surface to loosen the thatch. Unfortunately, the tine tip speed is limited to the speed of the tractor which results in incomplete dethatching. Also, the vertically projecting tines tend to break and dig into the ground causing damage to the ground surface. Further, similar to using the rake, the dislodged thatch needs to be removed after dethatching. Accordingly, an expensive sweeper attachment for the tractor is required or additional time consuming effort must be taken to collect and remove the lawn debris.

Haban et al., U.S. Pat. No. 5,408,813, disclose a dethatching apparatus for attachment to the rear of a tractor. The dethatching mechanism consists of a set of circumferentially and axially displaced wire tines attached to a pair of axially aligned shafts. Each of the shafts are driven by a respective wheel of the apparatus via a respective gear. The dethatching apparatus includes a catcher bag positioned behind the tines for receiving thatch and plant matter. The tines are biased in an angular relation to the respective shaft by at least one integral spring. Accordingly, the impact force of the tine with the ground is limited to the speed of rotation of the shaft and the material from which the tine is constructed of. Moreover, the shafts are powered by the rotation of the wheels which makes the rotational speed of the shaft dependant on the speed of travel of the tractor. If the tractor moves too slowly then the tines will not have a tendency to impact the ground with an insufficient force to properly dethatch. Alternatively, if the tractor moves to quickly then the tines will not impact the ground properly for dethatching the grass. In either case, if the wheels are not making proper rotational contact with the ground, such as may occur over excessively rough and uneven ground surface, then the tines will not rotate at a suitable speed. In addition, the catcher bag receives the thatch and grass matter near its lower front region which results in a tendency for that portion of the catcher bag to fill thereby only partially filling the catcher bag before it will not accept more materials. Thus additional stops to empty the partially filled catcher bag may be necessary.

What is desired, therefore, is a tractor based dethatching apparatus where the tines impact the ground with a force that is independent of the speed of the tract or together with a combined catcher bag that will substantially fill with thatch and lawn debris prior while dethatching.

SUMMARY OF THE INVENTION

The present invention overcomes the aforementioned drawbacks of the prior art by providing a grass dethatching system that includes a frame with at least one support member suitable to support the frame above the grass, the frame is adapted for mounting a dethatching apparatus, and the frame is adapted for detachably attaching to a vehicle. The dethatching apparatus includes a dethatch assembly rotatable about a central axis and at least one elongate member rotatable with the dethatch assembly at a location offset from the central axis. A plurality of tines are freely rotatably connected to and spaced apart along the elongate member in such a manner t hat the tines will periodically contact the grass when the dethatch assembly is rotated about the central axis. A drive assembly is connected to the frame which rotates the dethatch assembly at a rotational speed independent of the motion of the support member.

As such, the dethatching action of the tines occurs independently of the speed at which the vehicle or frame is traveling with respect to the ground. Therefore, rough or uneven ground will not effect the ability of the tines to dethatch the ground. In addition, if the tines strike a solid object they will simply rebound from the object and not stop or otherwise inhibit the forward travel of the dethatching apparatus.

BRIEF DESCRIPTION OF THE DRAWING

The FIGURE discloses an exemplary embodiment of the preferred embodiment of a dethatcher and a catcher bag.

DETAILED DESCRIPTION OF THE PREFERRED EMBODIMENT

Referring to the FIGURE a dethatching apparatus 8 includes a frame 10 with a rigid cross member 12 approximately three to four feet long and a pair of rigid end members 14 and 16 attached at right angles to the cross member 12. A hitch bracket 24 is rigidly connected to the cross members 12. The hitch bracket 24 is detachably attachable, or otherwise connected, to a intermediate hitch 28 which in turn is connected to a tractor 30. It is to be understood that any other suitable hitch bracket and intermediate hitch may likewise be used, if desired. A pair of opposing wheels 42 (one shown) are rotatably connected to a respective vertical support 40 which is in turn connected to the frame 10. During operation, the wheels 42 are in contact with a ground 44 in which preferably grass that needs dethatching.

The tractor 30 includes a drive pulley 32 which is rotatably powered by the tractor 30 independently of the dethatching apparatus 8. A belt 46 is coupled to the drive pulley 32 which causes the belt 46 to travel in a looped path. A first set of pulleys 47 direct the belt 46 directly over the end of the hitch bracket 24 so that the tension on the belt 46 remains constant when turning. A second set of directional pulleys 48 and 50 are rotatably connected to the center of the top side and bottom side, respectively, of the cross member 12. A third set of directional pulleys 52 and 54 are connected to one end of the end member 16 on the top side and bottom side, respectively. A pulley 56 is connected to a central shaft 58 of a dethatching apparatus 60. The central shaft 58 is supported by both of the end members 14 and 16. Accordingly, by moving the belt 46 the pulleys 48, 50, 52, 54, and 56 apply the rotational force of the drive pulley 32 to rotating the dethatching apparatus 60 in accordance with the rotational force of the drive pulley 32. It is to be understood that any other suitable drive scheme may be used to transfer power from the tractor 30 into rotational movement of the dethatching apparatus 60.

The dethatching apparatus 60 includes five spaced apart circular support members 64a–64e. Four equally spaced apart elongate support bars or members 66a–66d are positioned through respective holes in the circular support members 64a–64e. On each support bar 66a–66d located between each respective pair of circular support member 64a–64e are positioned five tines 68. The tines 68 are spaced apart by tubular spacers 70. The tines 68 are freely rotatably connected to the respective support bars 66a–66d. As the dethatching apparatus 60 rotates about its central axis which is coincident with the central shaft 58 the tines 68 spin, and otherwise rotate, about the respective support bars 66a–66d and periodically contact or impact the ground when proximate the ground thereby dethatching the grass. The tines 68 are preferably constructed from steel that is three inches long and ¾ of an inch wide. The tines 68 includes sufficient mass to impact the ground 44 with sufficient force to result in effective dethatching. In addition, the dethatching action of the tines 68 will occur independently of the speed at which the tractor 30 or frame 10 is traveling with respect to the ground 44. In addition, rough or uneven ground will not effect the ability of the tines 68 to dethatch the ground 44. Further, the belt 46 and pulley arrangement is simple to implement, which minimizes the expense of the dethatcher. In addition, if the tines 68 strike a solid object they will simply rebound from the object and not stop or otherwise inhibit the forward travel of the dethatching apparatus 8. It is to be understood that the tines 68 may likewise freely rotate about a limited angular region, if desired. The speed at which the dethatching apparatus rotates may be varied by different pulley ratios of the rotational speed of the drive pulley 32.

A catcher 80 includes a bin 82, preferably constructed of sheet metal, which is open at its top. A broad flexible "draper" 84 is mounted on an upper roller 86 and a lower roller 88. The catcher 80 is supported in its front by a pair of hitch bars 90 with a respective pin 92 that matingly engages a respective tube 94 affixed to the end members 16 and 14. The rear of the catcher 80 is supported by a roller 96 that travels on the ground. A flexible chain 100 and belt 102 transmit rotational motion from the roller 96 to the draper 84 by using a pair of pulleys 104 and 106. The top of the draper 84 moves in a rearwardly direction thereby transferring grass and other lawn debris dislodged from the ground 44 by the dethatching apparatus 60 onto the draper 84 away into the top of the bin 82. Accordingly, the thatch and lawn debris are automatically gathered up. Further, by depositing the thatch and lawn debris in the top of the 82, the bin 82 does not need to be emptied until substantially full thus decreasing the frequency of stops required to empty the bin 82. This permits the dethatching of the grass to be done faster.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A grass dethatching system comprising:
   (a) a frame that includes at least one support member suitable to support said frame above said grass, said frame adapted for mounting a dethatching apparatus, and said frame adapted for detachably attaching to a vehicle;
   (b) said dethatching apparatus comprising a dethatch assembly rotatable about a central axis and at least one elongate member rotatable with said dethatch assembly at a location offset from said central axis;
   (c) a plurality of tines freely rotatably connected to and spaced apart along said elongate member in such a manner that said tines will periodically contact said grass when said dethatch assembly is rotated about said central axis; and
   (d) a drive assembly connected to said frame which rotates said dethatch assembly at a rotational speed independent of the motion of said at least one said support member.

2. The grass dethatching apparatus of claim 1 wherein said frame detachably attaches to said vehicle with a hitch that defines a hole therein.

3. The grass dethatching apparatus of claim 1 wherein said dethatching apparatus further comprises:
   (a) a central member defining said central axis;
   (b) at least two spaced apart support members affixed to said central member and rotatable therewith; and
   (c) said at least one elongate member attached to said at least two spaced apart support members and rotatable therewith.

4. The grass dethatching apparatus of claim 1 wherein said dethatching apparatus includes four said elongate members.

5. The grass dethatching apparatus of claim 1 wherein said tines are freely rotatable 360 degrees.

6. The grass dethatching apparatus of claim 1 wherein said drive assembly includes a belt connected to said dethatch assembly and said vehicle.

7. The grass dethatching apparatus of claim 1 further comprising:
   (a) a thatch carrier connected to said grass dethatching apparatus suitable to store therein thatched materials from said tines contact with said grass;
   (b) said thatch carrier including a transport system for receiving said thatched material at a first position and transporting said thatched material to a second position at a greater elevation than said first position; and
   (c) said transport system collecting said thatched materials in said thatch carrier.

8. A grass dethatching apparatus comprising:
   (a) a frame that includes at least one support member that supports said frame above said grass, said frame adapted for mounting said dethatching apparatus, said frame adapted for detachably attaching to a vehicle;
   (b) said dethatching apparatus comprising a dethatch assembly rotatable about a central axis and at least one elongate member rotatable with said dethatch assembly at a location offset from said central axis;
   (c) a plurality of tines supported by and spaced apart along said elongate member in such a manner that said tines will contact said grass when said dethatch assembly is rotated about said central axis;

(d) a drive assembly connected to said frame which rotates said dethatch assembly;

(e) a thatch carrier connected to said grass dethatching apparatus suitable to store therein thatched materials resulting from said tines contact with said grass;

(f) said thatch carrier including a transport system for receiving said thatched material at a first position and transporting said thatched material to a second position at a greater elevation than said first position; and (g) said transport system collecting said thatched materials in said thatch carrier.

* * * * *